June 24, 1930.    L. LEE    1,768,086
HEATING SYSTEM
Filed Nov. 1, 1928    5 Sheets-Sheet 1

INVENTOR
Leif Lee,
By Byrnes, Stebbins & Parmelee
His attorneys.

June 24, 1930.                    L. LEE                    1,768,086
HEATING SYSTEM
Filed Nov. 1, 1928            5 Sheets-Sheet 2

INVENTOR
Leif Lee,
By Byrnes Stebbins &
Parmelee
His attorneys.

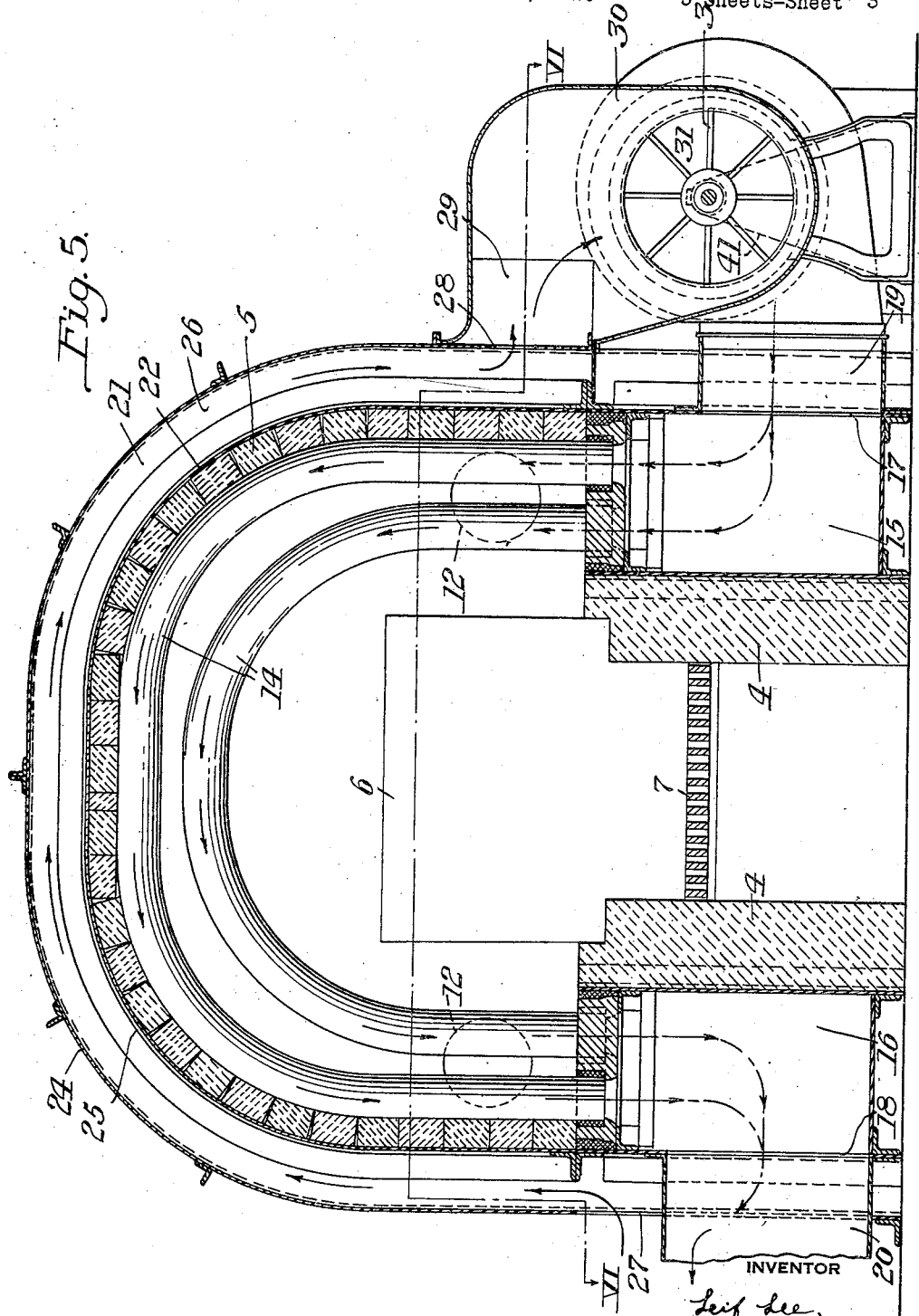

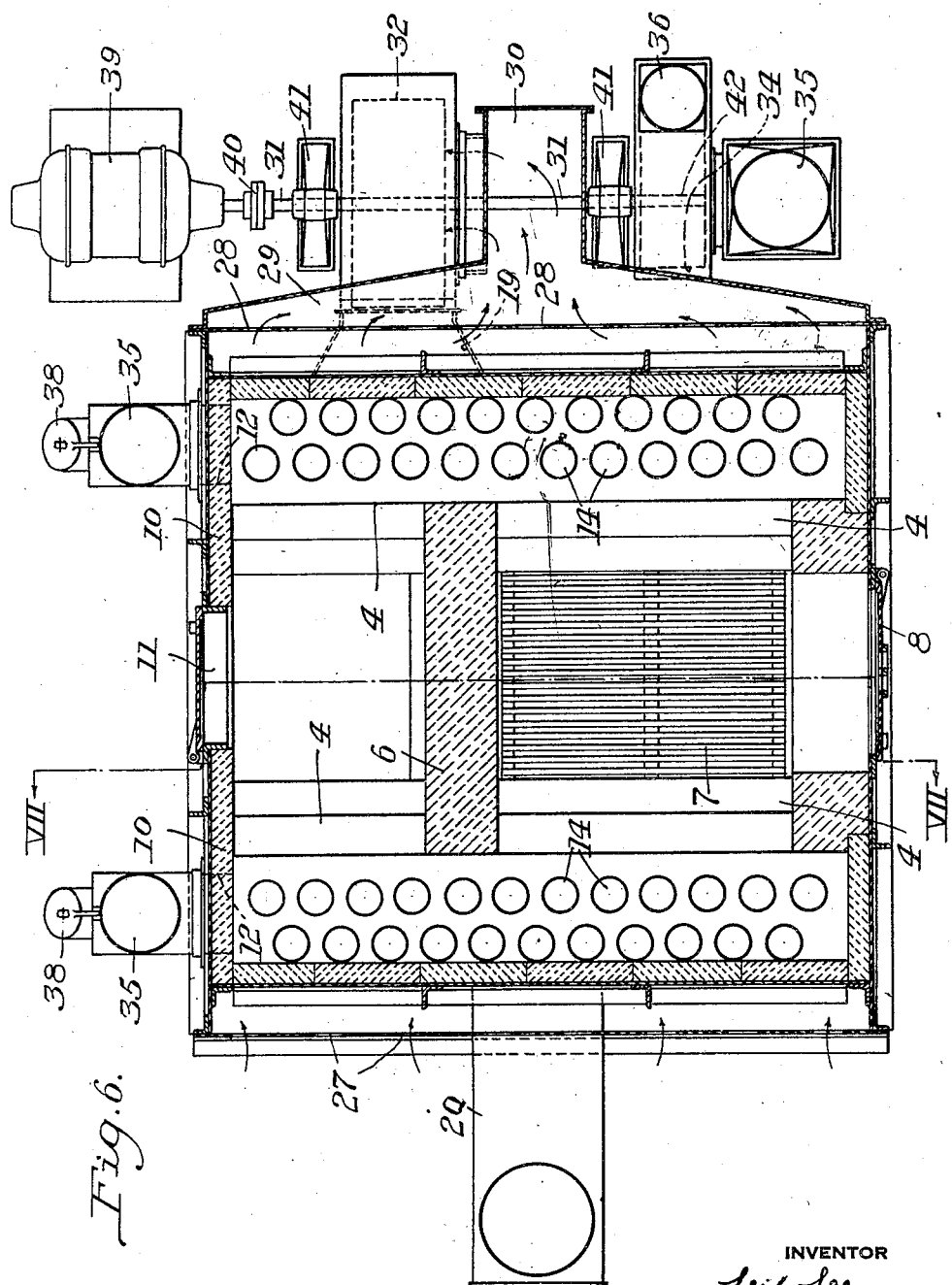

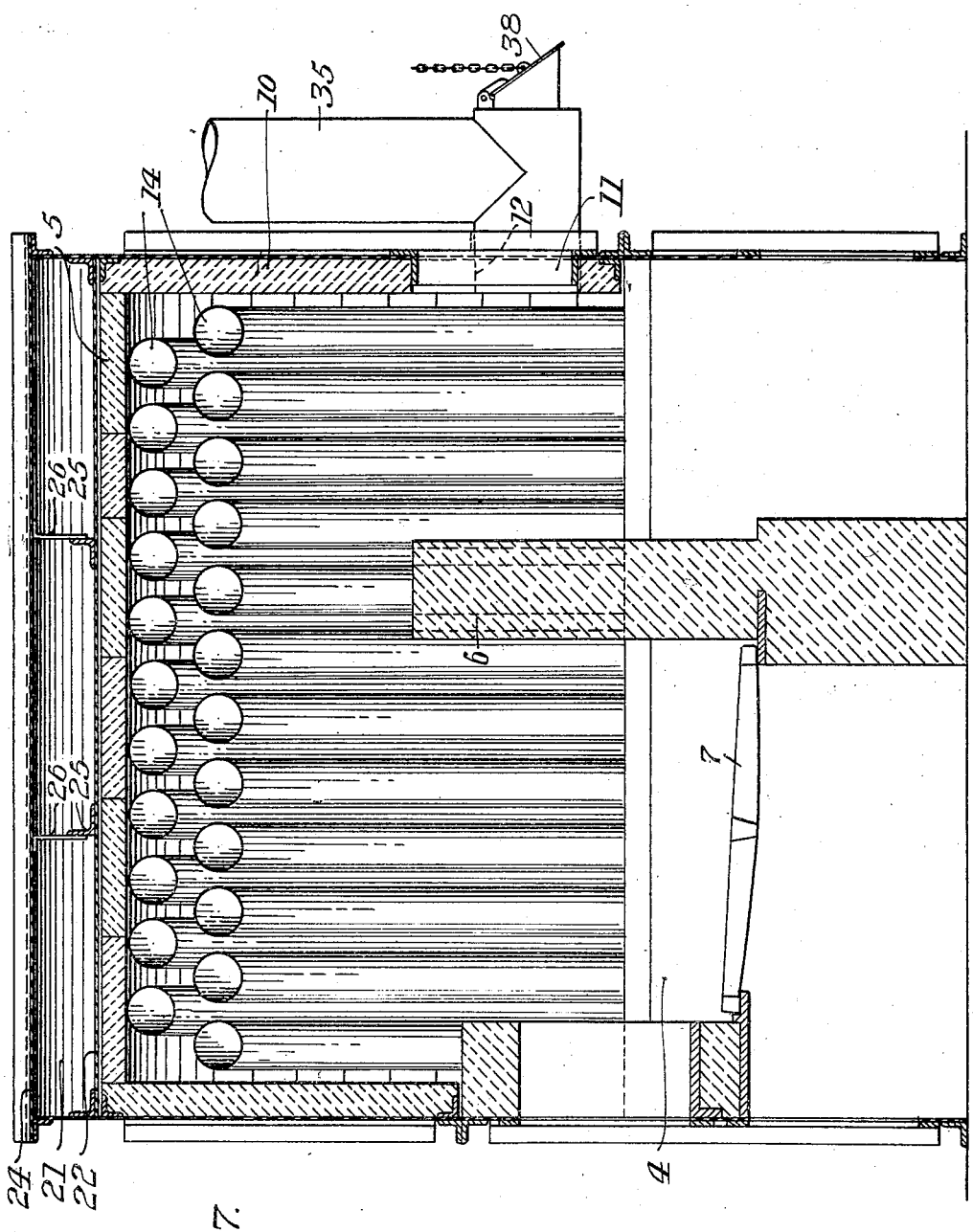

Patented June 24, 1930

1,768,086

UNITED STATES PATENT OFFICE

LEIF LEE, OF YOUNGSTOWN, OHIO

HEATING SYSTEM

Application filed November 1, 1928. Serial No. 316,497.

My invention relates to heating systems and more particularly to hot air heating systems. In heating fluids such as air and other gases, it has heretofore been proposed to circulate the gases through arched ducts overhanging a combustion chamber. The roof of the combustion chamber encloses such ducts. However, a material amount of the heat developed in the combustion chamber is radiated externally of the roof of the combustion chamber. The amount of radiation depends upon factors well known in the engineering art.

In such furnaces it has been customary practice to depend upon natural circulation for controlling the movement of the products of combustion through the combustion chamber. In some cases a forced draft has been used to move such products of combution.

Where attempts have been made to drive a plurality of circulating devices such as blowers from a single shaft, difficulty has sometimes been encountered due to slight misalinements of the supports for the shaft. Due to the high speed at which such shafts rotate, a slight misalinement causes a whipping action in the shaft. If a circulating device is mounted on the shaft and a whipping action takes place, there is danger of the blades of the circulating device being destroyed.

I provide a heater in which the fluid being heated is drawn through a duct mounted externally of the roof of the combustion chamber for preheating the fluid. The preheated fluid is then forced through internal ducts for completing the heating. An induced draft for the products of combustion in the heater is provided by a circulating device mounted on the same shaft with a circulating device for the fluid traversing the ducts. For preventing whipping in the shaft, it is mounted on a pair of supports and one of the circulating devices is overhung relative to one of the supports. This eliminates the danger of setting the shaft in a plurality of misalined bearings. Certain of the features of the present invention constitute improvements over the structure shown and described in my Patent No. 1,488,011, dated March 25, 1924.

The accompanying drawings illustrate the present preferred embodiment of the invention, in which—

Figure 1:
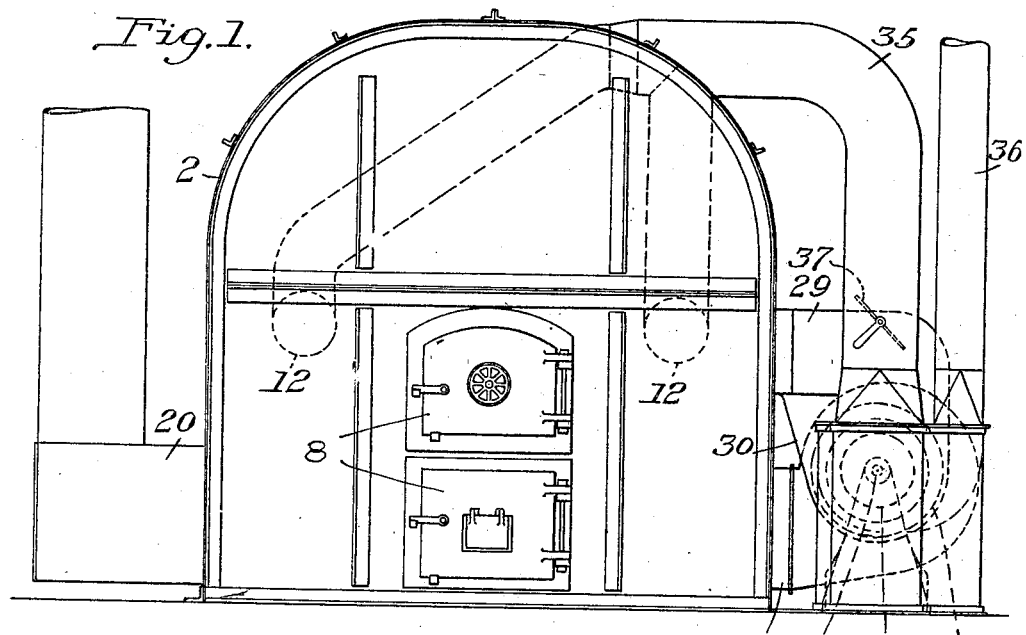
Figure 1 is a front view of a heater embodying my invention.
Figure 2:
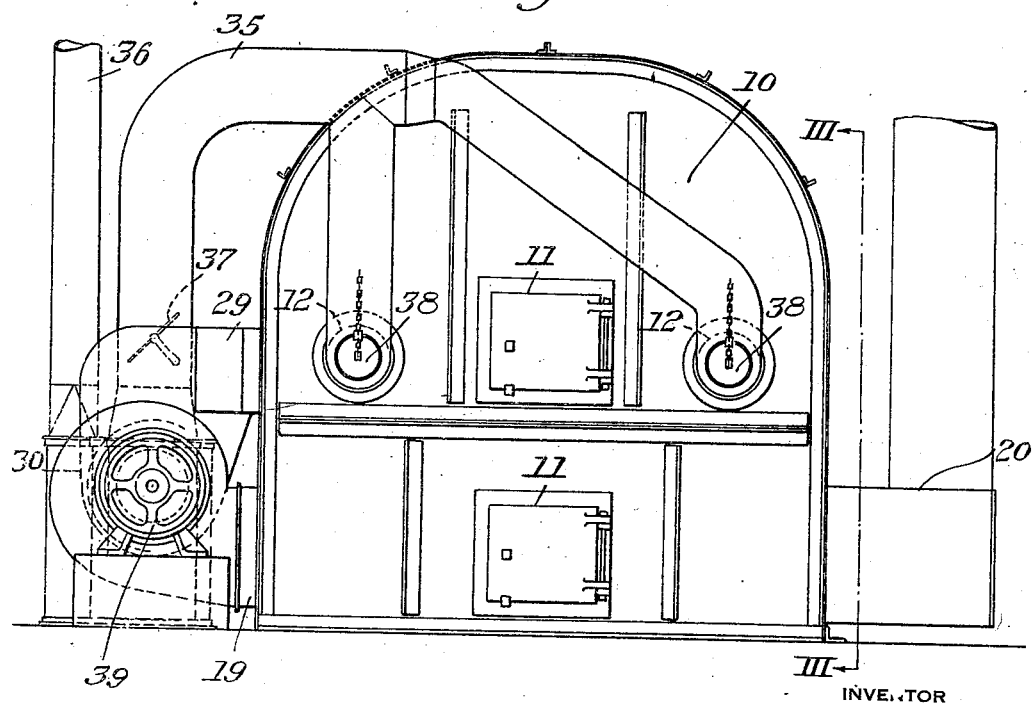
Figure 2 is a rear view thereof.
Figure 3:
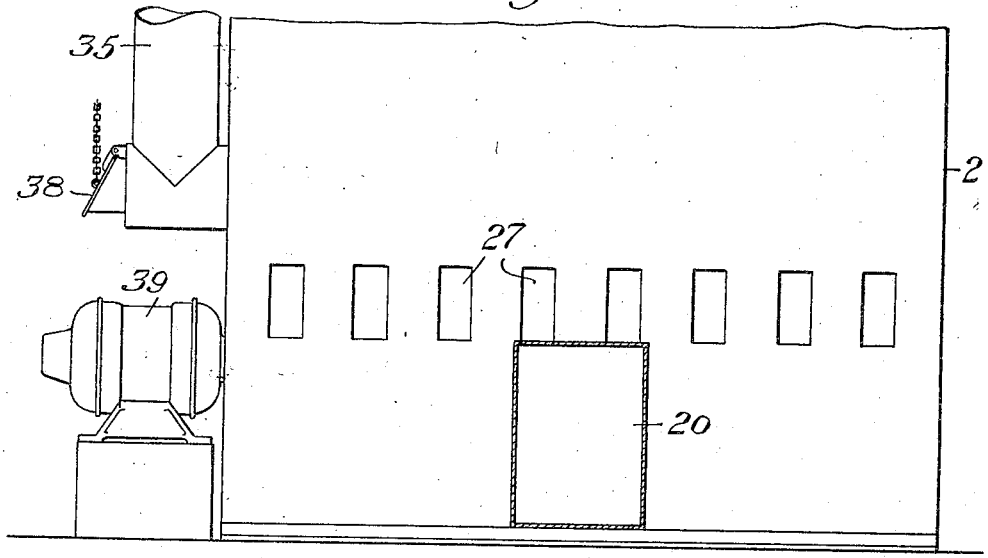
Figure 4:
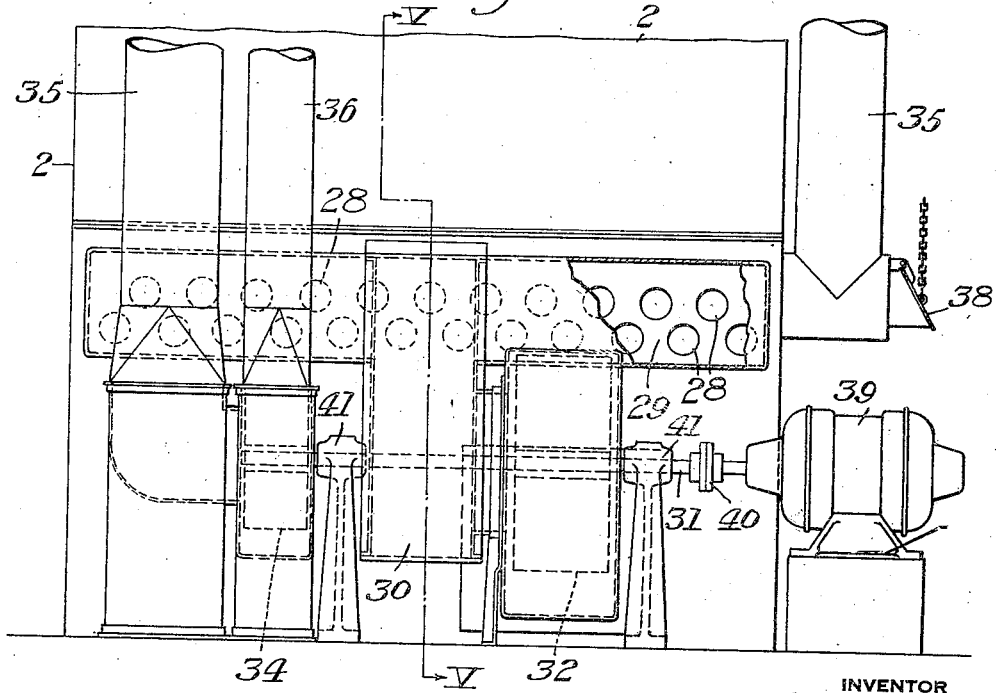

Figure 3 is a side view, partially in section, of the heater taken along the section line III—III of Figure 2, Figure 4 is a side view of the heater, partially in section, as viewed from the opposite side, Figure 5 is a transverse sectional view of the heater taken along the section line V—V of Figure 4, Figure 6 is a plan view in section taken along the section line VI—VI of Figure 5, and Figure 7 is a longitudinal sectional view of the heater taken along the section line VII—VII of Figure 6.

Referring to the drawings, a heater 2 comprises side walls 4 and a roof 5 of tile and masonry structure, such as are well known in the art. A fire wall 6 and a grate 7 are provided within the heater for supporting a bed of burning material. The combustion chamber so formed is closed at the front of the furnace by doors 8. The rear of the combustion chamber is closed by a wall 10 of masonry having man-holes 11 mounted therein. Ports 12 for the escape of the products of combustion are also disposed in the rear wall.

A plurality of tubes or ducts 14 span the side walls 4 of the heater and the intervening combustion chamber and are curved to conform to the general shape of the roof 5. The outer ducts 14 may engage and support the roof 5 if desired. The ducts terminate in longitudinally extending passageways 15 and 16 formed in the side walls 4. The ducts 15 and 16 terminate in ports 17 and 18, respectively, to which ducts 19 and 20 respectively, are connected. The ducts 14 span the combustion chamber and are exposed to the heated products of combustion as they pass from the grate 7 over the fire wall 6 to the outlet ports 12.

For preheating the fluid supplied to the ducts 14 the roof 5 is provided with a duct 21 spanning the side walls 4 and the intermediate combustion chamber externally of the roof. The duct 21 is constituted by an inner plate 22 directly engaging the roof 5, and an outer plate 24 spaced from the plate 22 by angle irons 25 and braces 26. If desired, the angle irons 25 and braces 26 may subdivide the duct 21 into smaller passageways. Fluid is caused to circulate through the duct 21 in a direction opposite to its direction in the ducts 14. The duct 21 terminates in a plurality of openings 27 formed in the outer surface of the heater above the level of the duct 20.

On the other side of the heater the duct 21 terminates in ports 28 leading into a passageway 29. The passageway 29 is connected to a duct 30 extending downwardly from the passageway 29 and enclosing a portion of a shaft 31. A circulating device 32, here illustrated as a rotary blower, is connected between the duct 19 and the duct 30, so that an induced circulation of fluid through the duct or ducts 21 is obtained and the fluid is forced through the duct 19, the passageway 15 and the ducts 14 to the passageway 16 and duct 20. The heated fluid is led to any desired distributing system.

A second blower 34 is also mounted on the shaft 31. The circulating blower 34 is connected to a system of ducts 35 leading to the outlet ports 12 in the combustion chamber. The products of combustion drawn into the blower 34 from the ducts 35 are discharged into a stack 36. A damper 37 is disposed in the ducts 35 to regulate the rate at which the products of combustion are withdrawn from the combustion chamber. Check drafts 38 are provided in the ducts 35. With this construction, the circulation of the products of combustion is induced through the combustion chamber.

The blowers 32 and 34 are rotated at relatively high speeds by a motor 39 connected to the shaft 31 by a coupling 40. The shaft 31 is supported by a pair of brackets 41. One of the brackets is disposed adjacent to the coupling 40, and the other is disposed between the blowers 32 and 34. By supporting the shaft 31 on a single pair of brackets, the tendency of the shaft to get out of alinement due to the presence of a plurality of misalined bearings and supports is eliminated. Due to the high speed at which the shaft 31 rotates, slight misalinements cause a whipping of the shaft which might cause the revolving blades of the blowers to engage their stationary housing and be destroyed. The rotor of the blower 34 is solely supported by a portion 42 of the shaft 31 extending outwardly from the support 41.

While the heater is particularly adapted for heating air to be used for heating buildings and the like, it is to be understood that the air may be used for other purposes. Also other forms of fluids, such as gases, may be circulated through the heater instead of air. Certain of the features of the invention are also applicable to the circulation of liquids.

While I have shown and described the present preferred embodiment of the invention, it is to be understood that it may be otherwise embodied without departing from the spirit of the invention or the scope of the appended claims.

I claim:

1. A heater comprising a combustion chamber having a roof, and heating ducts disposed internally and externally of said roof.

2. A heater comprising a combustion chamber having an arched roof, and heating ducts disposed internally and externally of said roof and conforming to the shape thereof.

3. A heater comprising a combustion chamber having a roof, heating ducts disposed internally and externally of said roof, and means for causing fluid to traverse said ducts in series.

4. A heater comprising a combustion chamber having a roof, heating ducts disposed internally and externally of said roof, and means for causing fluid to traverse the external duct for preheating and then traverse an internal duct for further heating.

5. A heater comprising a combustion chamber having a roof, heating ducts disposed internally and externally of said roof, and a circulating device for causing fluid to traverse the external duct for preheating and then traverse an internal duct for further heating.

6. A heater comprising a combustion chamber having a roof, heating ducts disposed internally and externally of said roof, and a blower for causing fluid to traverse the external duct for preheating and then traverse an internal duct for further heating.

7. A heater comprising a combustion chamber having a roof, heating ducts disposed internally and externally of said roof, and means for causing an induced movement of fluid through the external duct and a forced movement of the same fluid through the internal ducts.

8. A heater comprising a plurality of walls defining a combustion chamber, a duct mounted on an external surface of one of said walls, a duct mounted internally of said chamber, and means for causing fluid to traverse said ducts in series.

9. A heater comprising a plurality of walls defining a combustion chamber, a duct mounted on an external surface of one of said walls, a duct mounted internally of said chamber, and a circulating device for drawing fluid through the external duct wherein the fluid is preheated and discharging the fluid through the internal duct wherein the fluid is further heated.

10. A heater comprising spaced side walls, an arched roof, a plurality of arched internal ducts extending between said side walls, and a duct mounted externally of the roof and opening externally of the heater at at least one of said side walls.

11. A heater comprising spaced side walls, an arched roof, a plurality of arched internal ducts extending between said side walls, and a duct mounted externally of the roof and opening externally of the heater at said side walls.

In testimony whereof I have hereunto set my hand.

LEIF LEE.